June 12, 1928.  1,673,001
C. D. FAGAN
METER MOUNTING FOR SERVICE STATION EQUIPMENT
Filed July 28, 1927   3 Sheets-Sheet 2
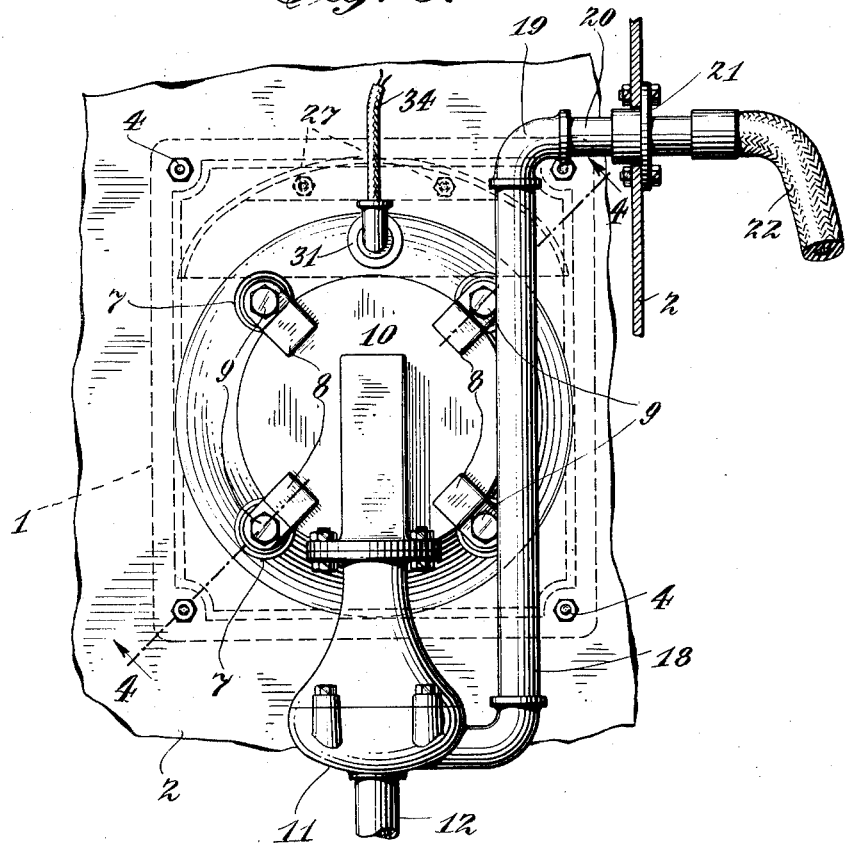
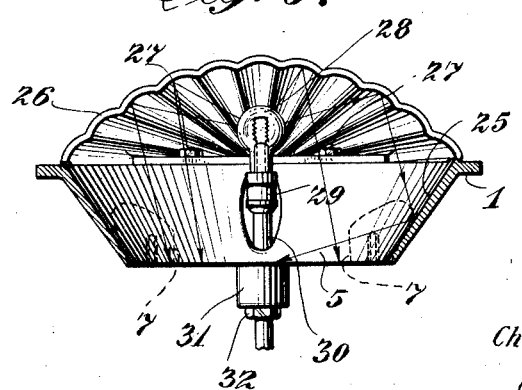
INVENTOR
Charles D. Fagan
BY
George Ramsey
ATTORNEY June 12, 1928.

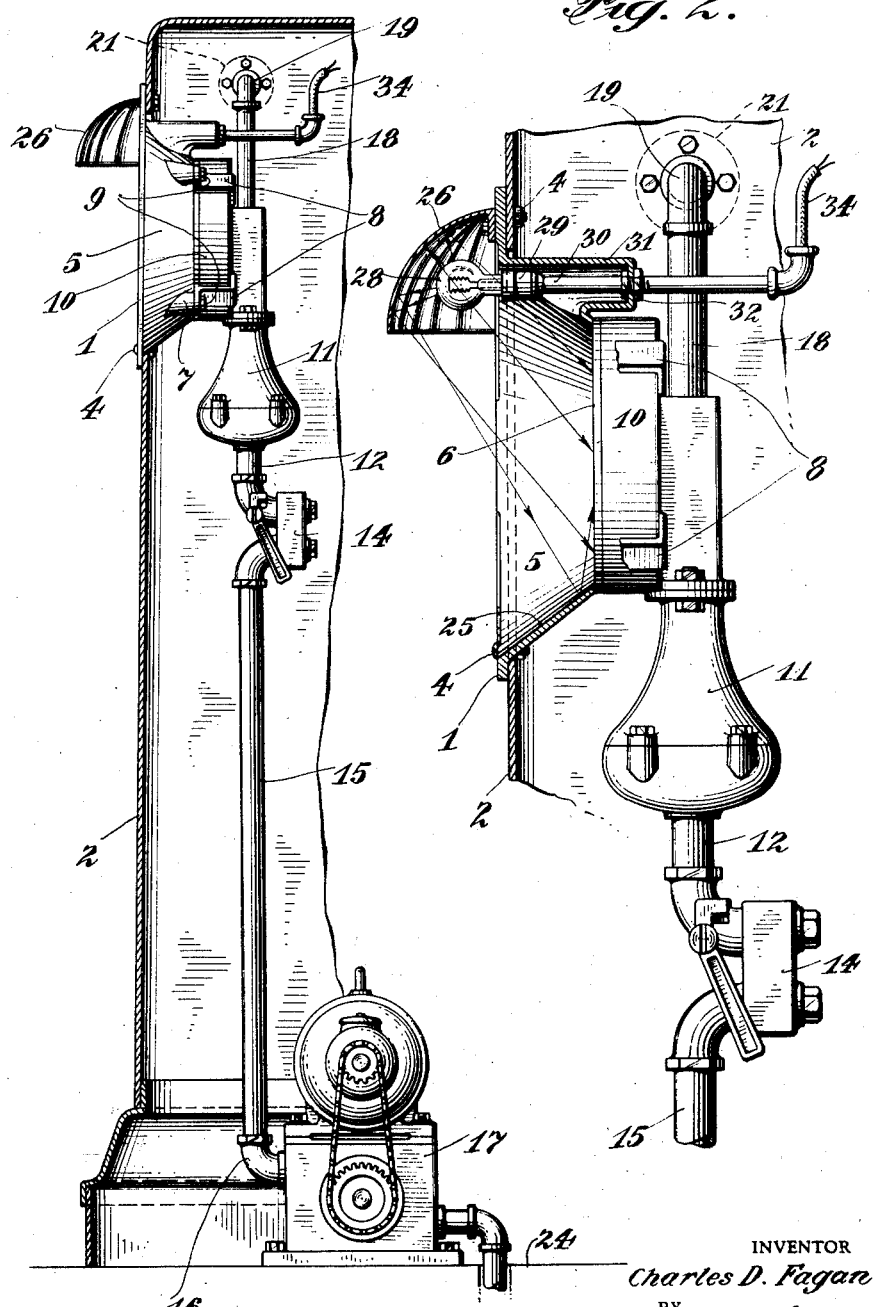

C. D. FAGAN 1,673,001

METER MOUNTING FOR SERVICE STATION EQUIPMENT

Filed July 28, 1927   3 Sheets-Sheet 3

INVENTOR
Charles D. Fagan
BY
George Ramsey
ATTORNEY

Patented June 12, 1928.

1,673,001

UNITED STATES PATENT OFFICE.

CHARLES D. FAGAN, OF SHARON, PENNSYLVANIA, ASSIGNOR TO SHARPSVILLE BOILER WORKS CO., OF SHARPSVILLE, PENNSYLVANIA, A CORPORATION OF PENNSYLVANIA.

METER MOUNTING FOR SERVICE-STATION EQUIPMENT.

Application filed July 28, 1927. Serial No. 209,154.

The present invention relates broadly to service station dispensing apparatus and more specially to a meter mounting for the same.

In the meter type of gasolene service apparatus it is desirable that the dial for the meter be closely associated with the metering mechanism. Since the dial must be placed in such manner as to be conveniently read, it is usually mounted high up on the casing or pedestal for the device. This requires the relatively sensitive metering mechanism to be placed high above ground upon a raised support. Heretofore in the art it has been customary to provide an opening, in the pedestal or main casing, for the face of the dial without provision for anchoring the dial to the casing so that the meter was supported only upon the pipe arrangements within the casing. These pipe arrangements usually were looped and not in the best form to comprise a rigid meter support.

In the present case the meter is rigidly and fixedly supported both by rigid pipe connections designed specially to provide a good support and also by the meter frame being securely anchored to a specially designed dial frame which is also constructed in such manner as to facilitate the full illumination of the dial by artificial light, such as electric light.

It is realized that the present invention may be embodied in constructions other than those specifically disclosed herewith and therefore this disclosure is to be understood as illustrative and not in the limiting sense.

Fig. 1 is an elevational view with a portion of the casing broken away illustrating a preferred form of the present invention.

Fig. 2 is a detail view of the meter mounting with portions in cross section to more fully illustrate the lighting for the meter dial.

Fig. 3 is a back view of a portion of the construction shown in Fig. 2.

Fig. 6 is a view on line 6—6 of Fig. 5 looking in the direction of the arrows and with the meter face omitted.

Figure 5:
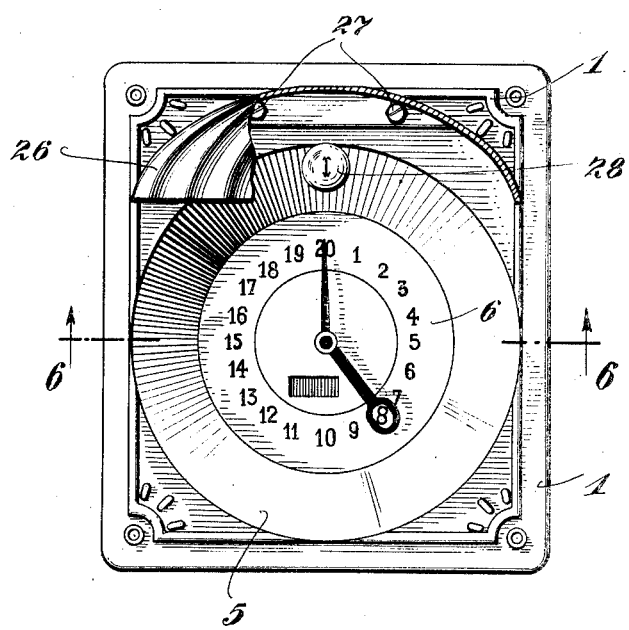
Fig. 5 is a front view of the dial casing showing the meter dial in place with portions broken away to show the mounting for the reflector.
Figure 4:
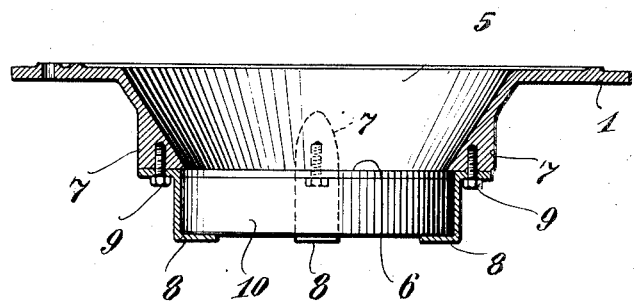
Fig. 4 is a cross sectional view on line 4—4 of Fig. 3.

Referring now more specially to Figs. 1 and 3, a dial frame 1 is anchored upon a main casing or pedestal 2 with suitable bolts 4 or other connections in such manner that the dial frame forms a substantially rigid part of the casing or pedestal 2. The dial frame 1 is provided with a circular inwardly sloping portion 5 comprising the frustum of a cone. This portion 5 comprises an inclined annular ring surrounding an opening through which the dial face 6 of the meter is adapted to be visible. Anchor blocks 7 are provided at suitable intervals on the back of this frustum adjacent the opening for the meter face and preferably are integral with the dial frame. In the form illustrated in the drawing four anchoring blocks are arranged at substantially 90° around the dial face. Z-shaped brackets 8 are mounted upon the anchor blocks 7 by machine screws or stub bolts 9 and tightly clamp the dial casing 10 against the inner end of the sloping portion 5 of the dial frame in such manner as to rigidly anchor this dial casing 10 to the pedestal or main casing 2. The dial casing 10 is an integral part of the general meter casing 11 for the metering mechanism. Therefore, it will be observed that the meter as a whole is accurately and securely anchored to the pedestal of the device. The piping system leading to the meter is arranged in a vertical line directly beneath the center of the meter in such manner as to comprise a rigid vertical staff or support for the meter. This pipe system may comprise a connection 12 to a suitable valve 14, and a vertical inlet pipe line 15, which may be securely anchored in the bottom of the casing as for example by means of the elbow 16 extending from a suitable pump mechanism 17. It being understood that where the gasolene or other liquid is raised to the meter and forced through the same by pneumatic pressure or otherwise an anchoring bracket or other securing means takes the place of the pump 17 so far as the support for the vertical inlet pipe 15 is concerned.

Referring more specially to Fig. 3, it will be observed that the outlet pipe connections from the meter 11 also comprise rigid supports for the meter and this outlet piping may comprise a vertical outlet pipe 18 connected by an elbow 19 with a short connection 20 anchored in a rigid bracket 21 so that this outlet piping likewise rigidly connects the meter to the casing, and in view of the fact that the bracket 21 is bolted or otherwise secured to the pedestal frame 2 any shocks due to manipulation of the service hose 22 is not transmitted back to the internal piping including the meter, but is transmitted direct to the pedestal casing or frame 2.

From the foregoing it will be observed that the meter 11 has three points of anchorage or suspension; the first being the vertical pipe line system including the vertical inlet pipe 15 directly beneath the meter, which tends to sustain the weight of the meter, the liquid in the meter mechanism, and the vertical column. The bottom of this vertical system of support being the flooring 24 which may be concrete or other proper foundation upon which the lower end of the vertical inlet pipe 15 is supported through a pump or other supporting member. The second anchor for the meter comprises the outlet piping 18, the upper end of which is rigidly anchored to the pedestal casing 2, the lower end of which is anchored to the meter 11. The third and most important anchorage for the meter comprises the Z-shaped brackets 8 which are firmly anchored to the dial frame 1 which in turn is securely bolted to the pedestal casing 2.

From the foregoing it will be observed that the meter is protected from shocks and is anchored securely in such manner as to facilitate its accurate operation, which is very necessary for public dispensing and sale of gasolene or other liquids.

The above specified mounting for the meter adapts itself admirably to artificial lighting in that the inner surface 25 of the conical sloping portion 5 of the dial frame 1 reflects light in all directions into and against the dial face 6, both daylight and artificial light. To facilitate the reading of the dial at night a curved reflector 26 is secured by bolts 27 to the dial frame and forms a canopy over an eletcric light 28. This electric light preferably is mounted upon a socket 29 which may be supported upon a rigid pipe 30 screw threaded into a cylindrical pocket 31 integral with the dial frame 1. This supporting pipe 29 is locked and hermetically sealed in position against the end of the cylindrical pocket by means of a lock nut 32. A suitable electrical flexible conduit 34 may be connected with the pipe 31 in such manner as to also form a hermetic joint therewith. This mounting hermetically seals the electric light and the socket connection from the interior of the pedestal 2 and consequently prevents any gasolene vapors from entering the cylindrical pocket 31 or entering into the zone of the electric light, which is located in the atmosphere outside of the pedestal casing 2. This arrangement is particularly desirable for safety in that the accidental breaking of the globe or the loosening of the light in such manner as to cause space between the light and the socket connections to cause sparks in no way raises any liability of an explosion due to any accumulation of vapors within the casing. Furthermore, in view of the fact that gasket material may be placed between the dial casing 10 and the inner end of the dial frame portion 5, the mounting forms a waterproof construction against moisture or rain driving into the casing and rusting or otherwise damaging the meter parts, valves, or other connections within the casing.

The curved reflector 26 forming the canopy over the electric light 28 not only protects the light from water and breakage due to automobile tires throwing pebbles or other accidents, but greatly facilitates the illumination of the dial because of the relative positions and shape of the reflector 26 and the conical sloping portion 5 surrounding the dial.

By referring to Figs. 2 and 6 it will be observed that light rays from the electric light 28 which strike the curved reflector 26 are reflected either directly on the dial face 6 or are reflected from the sloping conical portion 5 to the dial face. This arrangement provides an even uniform brilliant lighting for the dial so that not only the dial is clearly and brightly illuminated to be easily read by the operator, but it is so brilliantly illuminated that it may be easily read by the purchaser of gasolene at a considerable distance from the dial.

The present invention provides not only a rigid support for the meter which is extremely desirable, but also facilitates fireproofing and waterproofing the connected parts and rendering the same visible due to the organization of the rigid anchoring parts in such manner as to direct light uniformly over the meter dial.

Having described my invention what I claim is:

1. In a device of the class described, housing means provided with an opening for a meter dial, a liquid meter within said housing, a system of piping adapted to partially support the meter with the dial thereof opposite said opening, a dial casing secured to said meter, and anchoring means to anchor said dial casing to said housing adjacent said opening.

2. In a device of the class described, housing means provided with an opening for a meter dial, a liquid meter within said housing, a dial casing secured to said meter, anchoring means to anchor said dial casing to said housing adjacent said opening, and pipe means beneath said meter to support the weight thereof.

3. In a device of the class described, a combination of a dial frame having a frusto-conical surface leading to a dial opening, a liquid meter having a casing, said casing being provided with a face portion adapted to be secured to said frame, and anchoring means to anchor said casing against the smaller end of said frusto-conical surface on said frame.

4. In a device of the class described, a combination of a dial frame comprising a frusto-conical member leading to a dial opening, a liquid meter, a dial casing for said meter and provided with a face portion adapted to be secured to said frame, and anchoring means comprising Z-shaped brackets to anchor said dial casing against the smaller end of said frusto-conical member to hermetically seal the casing against the dial frame.

5. In a device of the class described, the combination of a dial frame, a pedestal support for said dial frame, a liquid meter, and means to anchor said liquid meter to said dial frame, said dial frame having a conical ring leading to the face of said meter.

6. In a device of the class described, the combination of a vertical pipe system, means to support the lower end of said pipe system, a liquid meter mounted upon the upper end of said pipe system in such manner that said pipe system contributes to the support of said meter, a dial frame, and means to anchor a portion of said meter to said dial frame.

7. In a device of the class described, the combination of a housing, a vertical pipe system within the housing, means to support the lower end of said pipe system, a liquid meter mounted upon the upper end of said pipe system in such manner that said pipe system contributes to the support of said meter, a dial frame, means to anchor a portion of said meter to said dial frame, and outlet piping connected to said meter and anchored to said housing.

8. A device of the class described comprising a pedestal casing, a dial frame secured to said pedestal casing, said dial frame being provided with a frusto-conical portion comprising a light reflector, anchoring lugs on the back of said frusto-conical portion, a dial casing adapted to fit over the opening at the smaller end of said frusto-conical portion, and means anchored upon said anchoring lugs to securely lock said dial casing against said frusto-conical portion.

9. A device of the class described comprising a pedestal casing, a dial frame secured to said pedestal casing, said dial frame being provided with a frusto-conical portion comprising a light reflector, anchoring lugs on the back of said frusto-conical portion, a meter having a dial casing adapted to fit over the opening at the smaller end of said frusto-conical portion, means to support said meter, and means anchored upon said anchoring lugs to securely lock said dial casing against said frusto-conical portion and hermetically seal the dial casing to the said portion.

10. In a device of the class described, the combination of a pedestal housing, a dial frame secured to said pedestal housing, said dial frame comprising a frusto-conical portion having an internal light reflecting surface, a meter provided with a dial casing, means to anchor said dial casing against said frusto-conical portion, an electric light mounted adjacent said frusto-conical portion, and a shield over said light to reflect the rays thereof against said dial face and against said frusto-conical portion.

11. In a device of the class described, the combination of a pedestal housing, a dial frame secured to said pedestal housing, said dial frame comprising a frusto-conical portion having an internal light reflecting surface leading to a dial face opening, a meter provided with a dial casing, means to mount said dial casing adjacent the opening in said frusto-conical portion, an electric light mounted adjacent said frusto-conical portion, and a shield over said light to reflect the rays thereof against said dial face and against said frusto-conical portion.

12. In a device of the class described, the combination of a pedestal housing for a meter, a dial frame, a dial casing with a meter dial therein, means to anchor said casing to and hermetically seal the same against said dial frame, said dial frame being provided with a recess for supporting an electric light, said dial frame having an inclined annular zone leading to the meter dial, a canopy for said light and adapted to reflect the rays from said light to the meter dial, and means for hermetically sealing said recess against explosive vapors arising within the pedestal housing.

13. A device of the class described comprising a dial frame having a frusto-conical portion with a dial opening therein, a light supporting chamber integral with said dial frame, electric light supporting means hermetically sealed to one wall of said chamber and adapted to carry an electric light, and a canopy comprising a reflector extending over the upper portion of said frusto-conical portion and being adapted to reflect light toward the dial opening in said frusto-conical portion.

14. A device of the class described comprising a dial frame having a frusto-conical portion with a dial opening therein, a light supporting chamber adjacent the frusto-conical portion, electric light supporting means hermetically sealed to one wall of said chamber and adapted to carry an electric light, and a canopy comprising a reflector extending over the upper portion of said frusto-conical portion and being adapted to reflect light against the frusto-conical portion and therefrom into the dial opening.

15. In a device of the class described, a pedestal housing, a liquid meter mounted within said pedestal housing, a dial frame carried by said pedestal housing and provided with an opening, a dial casing carried by said meter, means to anchor said dial casing to said dial frame, an inlet pipe to said meter, an outlet pipe from said meter, a service hose connected with said outlet pipe, and means to anchor the terminal of said outlet pipe to said pedestal housing adjacent the connection with the service hose to prevent vibration and shock from said service hose being communicated to said meter through said outlet pipe.

CHARLES D. FAGAN.